United States Patent Office  2,839,999
Patented June 24, 1958

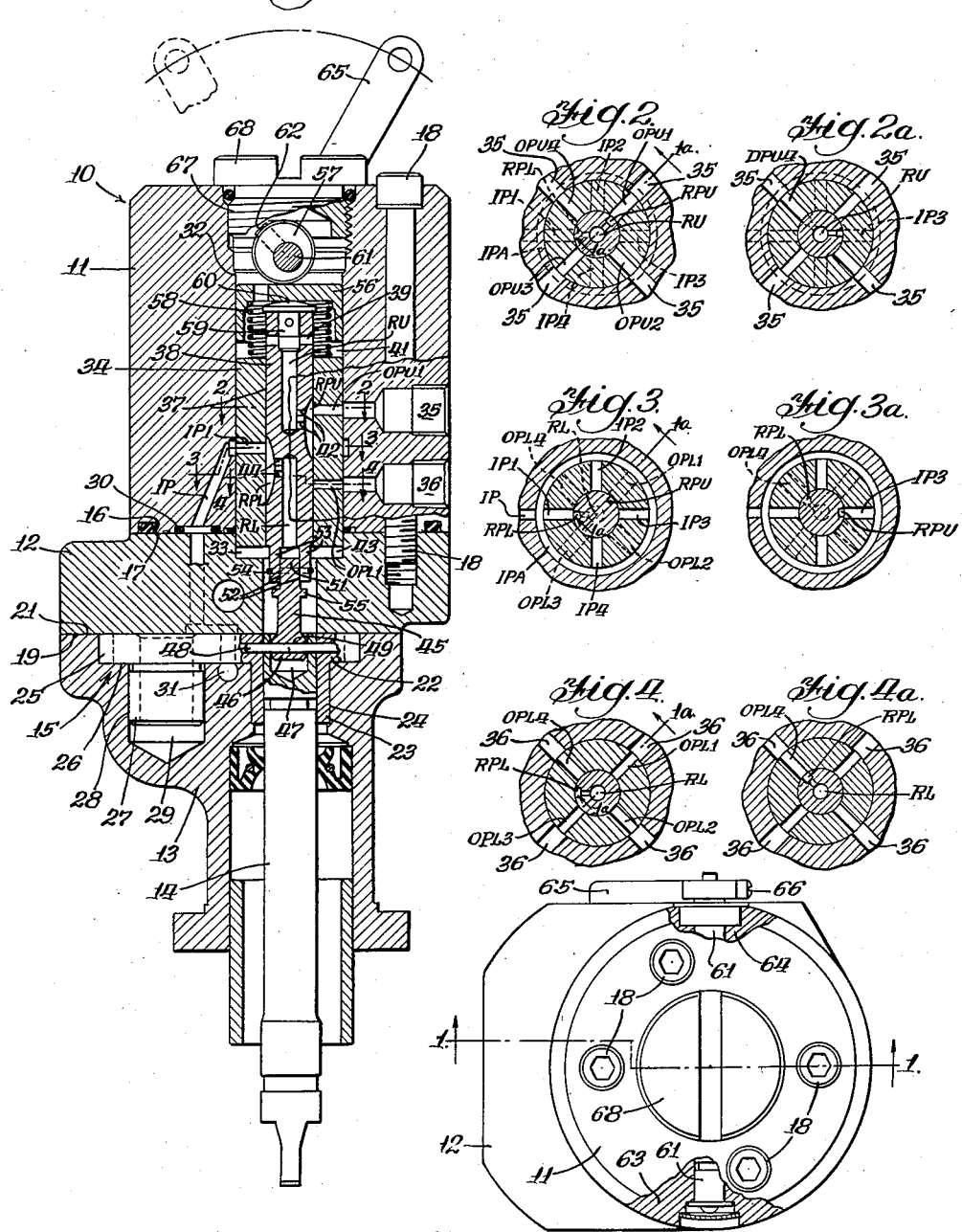

2,839,999

LIQUID FUEL PUMPING AND METERING DISTRIBUTOR WITH ROTATING PUMPING AND DISTRIBUTING PLUNGER

Robert L. Shallenberg, Westchester, Ill., assignor to International Harvester Company, a corporation of New Jersey Application December 20, 1955, Serial No. 554,239

10 Claims. (Cl. 103—2)

This invention has to do with dispensing devices of the type having a floating plunger reciprocated by the dispensed material for alternate displacement of metered quantities thereof from chambers at opposite ends of the plunger, and more particularly concerns such a device in which the plunger is also rotated to cyclically establish communication of the chambers with outlets through which the metered quantities are respectively discharged. The herein illustrated species of the device is designed for pumping, metering and distributing gasoline to injection nozzles for the combustion chambers of a piston type spark-ignition internal combustion engine.

An important object of this invention is the provision of a floating plunger liquid fuel pumping and metering distributor device of simplified, rugged and economically produced structure wherein there is drive means for rotating the plunger while facilitating axial reciprocation thereof by the pressure of liquid fuel supplied thereto for distribution under the control of port means in the plunger which, during rotation thereof, alternately directs the fuel to pumping chambers at opposite ends of the plunger to cause its reciprocation, and also establishes communication with the alternately contracting chambers to direct the fuel pumped therefrom successively through respective outlet ports.

The invention further contemplates variable metering of the distributed fuel by the use of selectively settable stop means cooperable with the floating plunger to vary the range of reciprocation thereof for determining the amount of fuel admitted to the pumping chambers and subsequently expelled therefrom.

A further object is the provision in a fuel pumping and metering distributor of a supply pump having a rotatable element operated by the drive shaft for rotating the floating plunger, which supply pump is operable to deliver fuel to inlet port means of the distributor device at a pressure sufficient to reciprocate the plunger.

A further object is the provision of a rotatable driving element connected between the drive shaft and the rotatable oscillating plunger and capable of being angularly cocked with respect to the axes of such shaft and plunger without interfering with the transmission of power between these two parts and thus provide for misalignment tolerance of the drive shaft and plunger axes.

The above and other desirable objects inherent in and encompassed by the invention are elucidated in the ensuing specification, the appended claims and the annexed drawings, wherein:

Fig. 1 is a sectional view taken longitudinally through the casing of a preferred embodiment of the invention at a plane indicated by the line 1—1 of Fig. 5 coinciding with the axes of a drive shaft and the floating plunger of the device, except for a cutaway portion which shows part of the plunger and casing with a reversible flow port of the plunger and certain of the outlet ports of the casing in a vertical plane displaced from the principal plane of the view in an angular relation to coincide with the line 1a—1a in each of Figs. 2, 3 and 4.

Fig. 2 is a fragmentary transverse sectional view taken through the plunger and a surrounding portion of the casing of the device in registration with a set of outlet ports at the plane indicated by the line 2—2 in Fig. 1.

Fig. 3 is a transverse sectional view taken similarly to Fig. 2, but at a position of lower elevation and in registry with fuel inlet port means as indicated by the line 3—3 in Fig. 1.

Fig. 4 is a sectional view taken similarly to Figs. 2 and 3 but at a still lower position of elevation in registry with a second set of outlet ports as indicated at the line 4—4 in Fig. 1.

Figs. 2a, 3a and 4a respectively correspond to Figs. 2, 3 and 4 but show the plunger at a different position of rotation.

Fig. 5 is a top end view of the device with portions of the casing broken away to show bearing mountings for a control shaft.

With continued reference to the drawings and particularly to Fig. 1 the device can be seen to comprise a casing 10 having generally cylindrical upper part 11, a center part 12 and a lower part 13. Parts 11 and 12 contain the distributor proper whereas the lower casing part 13 contains a drive shaft 14 for the device and a fuel supply pump 15 for delivering liquid fuel to the distributor for operation thereof and for distribution thereby. A flat lower end face 16 of the upper casing part 11 is mounted against a flat upper face 17 of the center plate or part 12 and these two parts are held in assembly by long bolts 18. Similar bolts, not shown, but shorter than the bolts 18 are used for holding the flat upper face 19 of the lower casing part 13 against the flat lower face 21 of the casing center part 12.

The supply pump 15 which is of the gear species comprises a rotatable element in the form of a gear 22 having an axially extending tubular hub 23 mounted upon the upper end portion of the drive shaft 14 for rotation therewith. Gear hub 23 is journalled within a bearing 24 in the casing part 13. This gear 22 and a companion gear 25 meshed therewith are disposed within a recess 26 in the upper face 19 of the casing part 13, which recess is closed by the lower face 21 of the casing central part 12. Pump gear 25 is formed similarly to the gear 22 with a tubular hub extension 27 journalled within the cylindrical side wall 28 of a recess 29.

Liquid fuel from a supply not shown is fed into the supply pump 15 through an inlet passage 31 and this fuel is delivered by the pump at an increased pressure through an inlet passage IP to an annular inlet passage IPA. An O-ring 30 seals the passage IP where it passes through the casing part faces 16 and 17. Annular passage IPA and four radial fuel inlet ports IP1, IP2, IP3, and IP4, Figs. 1 and 3, constitute fuel inlet passage means of the distributor device. The four inlet ports IP1 through IP4 which are intercommunicative through the annular inlet passage IPA constitute inlet port means.

A vertical cylindrical bore 32 in the casing part 11 axially aligns with a cylindrical stepped bore 33 in the casing part 12 and these two bores receive respective portions of a metering head bushing 34 which pilots these casing parts into proper registration for assembly by the bolts 18. This bushing 34 is press-fitted into the bore 32 where it is immovable both axially and rotatively. The annular fuel inlet passage IPA circumscribes this bushing 34, and the above described fuel inlet ports IP1 through IP4 are formed in this bushing. Bushing 34 also contains fuel outlet port means comprising an upper set of four fuel outlet ports OPU1, OPU2, OPU3 and OPU4 which are visible in Figs. 2 and 2a and of which the port OPU1 is visible in Fig. 1. Each of these fuel outlet ports has an enlarged diameter outer portion 35 formed in the casino part 11 to facilitate the coupling thereto of a fuel line (not shown) leading to a respective injection nozzle for an engine to be served by the device. A lower outlet port means comprises a set of four outlet ports OPL1, OPL2, OPL3 and OPL4 extending radially through the bushing 34 in a common horizontal plane below the plane containing the fuel inlet ports IP1 through IP4. All four of the ports in this second set of outlet ports are shown in Fig. 4 in full lines and appear in dotted lines in Fig. 3. Only the port OPL1 is visible in Fig. 1. Each of the ports OPL1 through OPL4 has an enlarged outer diameter portion 36, Fig. 1, to facilitate the coupling thereto of a respective fuel line (not shown) leading to an injection nozzle of the engine. The device has eight outlet ports OPU1 through OPU4 and OPL1 through OPL4 and is, therefore, designed for operation with an eight cylinder piston type engine.

An examination of Figs. 2, 3 and 4 will reveal that the two sets of outlet ports OPU1 through OPU4 and OPL1 through OPL4 are in phase circumferentially of the principal axis of a vertical bore 37 through the bushing 34, and that the set of inlet ports IP1 through IP4 have an out-of-phase displacement with respect to the outlet port sets of one-half the angular spacing between the outlet ports circumferentially of such axis.

A plunger 38 is disposed rotatively and axially reciprocally within the bushing bore 37. A reversible flow passage RU communicates outwardly through the upper end of the plunger 38, that is, through a diametric lateral portion 39 of such passage with a pump chamber 41 bounded by the casing bore 32 above the bushing 34. Laterals 42 at the lower end of this upper reversible flow passage RU communicate with an upper reversible flow port RPU in the form of a narrow vertical recess formed in the cylindrical periphery of the plunger. This reversible flow port RPU sweeps through communicative registry with the fuel inlet ports IP1 through IP4 and with the fuel outlet ports OPU1 through OPU4 during rotation of the plunger. A lower reversible flow passage RL communicates through the lower end of the plunger 38 with a pump chamber 43 contained within the casing-part bore 33 below the lower end of the bushing 34. Reversible flow passage RL communicates through laterals 44 with a lower reversible flow port RPL in the form of the narrow vertical slot formed in the cylindrical periphery of the plunger 38. Reversible flow port RPL sweeps through positions of communicative registry with the fuel inlet ports IP1 through IP4 and with the fuel outlet ports OPL1 through OPL4, constituting the lower set, during rotation of the plunger. These reversible flow passages RU and RL together with the reversible flow ports RPU and RPL therefore constitute reversible flow fluid conducting means within the plunger.

A rotatable driving element 45 establishes a rotative driving connection between the plunger 38 and the drive shaft 14. This driving element 45 has a semi-spherical driven end portion 46 disposed within a recess 47 in the upper end of the drive shaft 14 that allows universal angular disalignment of the element 45 with respect to the drive shaft 14, that is, disalignment from a position of coaxial relation with respect to the drive shaft. A pin 48 which extends diametrically through the pump gear 22, shaft 14 and the spherical driven end portion 46 of the plunger driving element 45 constrains both this gear and the element 45 for rotation with the shaft, and a bearing bore 49 in the element 45 for receiving the pin 48 is slightly oversize with respect thereto to avoid constraining the element 45 within a plane perpendicular to the pin. A tongue 51 on the upper end of the driving element 45 has opposite flat faces 52 which fit slidably between downwardly projecting furcations 53 on the lower end of the plunger 38 and with a slight clearance. This tongue cooperates with the furcations 53 to impart rotational movement to the plunger 38 while facilitating axial reciprocation of the plunger relatively to such driving element 45. A snap ring 54 embracing the furcations 53 prevents the tongue 51 from sliding laterally from between the furcations. Because of this described relation between the tongue 51 and the plunger furcations 53 the plunger driving element 45 is adapted to facilitate universal angular disalignment of such element relatively to the plunger axis and consequently this driving element 45 allows for some tolerance of disalignment between the drive shaft 14 and the plunger 38 driven thereby through the connection afforded by such driving element.

Adjustable stop means for limiting movement of the plunger 38 in opposite axial directions includes a lower component in the form of a shoulder or rib 55 circumscribing the plunger driving element 45, and an upper component in the form of a skirted piston 56 slidable vertically in the casing bore 32 and held upwardly against an adjusting cam member 57 by a helical spring 58. A bearing member 59 disposed within the upper end of the plunger 38 has a hardened head 60 which bears against the underside of the stop member component 56.

The cam 57 is mounted upon the control shaft 61 and held non-rotatively thereon by a set screw 62. The control shaft 61 extends diametrically across the casing bore 32 where end portions of such shaft are journalled in casing bearing portions 63 and 64. A control lever 65 is mounted upon an outer end of the control shaft 61 to which such lever is secured by a set screw 66, Fig. 5. The upper end of the casing bore 32 is closed by a threaded plug 67 having a diametrically grooved flat head 68.

Operation of the device

The illustrated device is designed primarily for use with gasoline spark-ignition engines of the piston type, since this distributing device does not dispense the metered fuel at a pressure in excess of that developed by the delivery gear pump 15. Fuel pressure of 150 to 200 lbs. per square inch delivered by this pump 15 upwardly through the passage IP to the annular inlet passage IPA is adequate to cause operation of the device as intended. Since there are eight fuel outlet ports, the four upper ports OPU1 through OPU4 and the four lower ports OPL1 through OPL4, the device is adapted for operation with an eight cylinder reciprocating engine. Fuel lines, not shown, will be connected respectively between these fuel outlet ports and injection nozzles disposed for injection directly into the combustion chambers of the engine or into air intake manifold elbows or other air inlet passages communicative with the combustion chambers.

The drive shaft 14 and consequently the plunger 38 of the device are rotated at constant speed in a clockwise direction as viewed from above in Figs. 2, 3 and 4. Fuel delivered by the supply pump 15 through the inlet passage IP and the annular inlet channel IPA flows into the four inlet ports IP1 through IP4 in all of which this fuel supply is always maintained at the fuel supply pressure. This is believed apparent from Figs. 1 and 3.

In the rotative position of the plunger 38 shown in Figs. 1 through 4, the lower reversible flow port RPL communicates with the fuel inlet means through the port IP1 wherefore fuel has flowed downwardly through the reversible flow passage RL into the pump chamber 43 to place a metered charge of fuel into this chamber attendant to having forced the plunger endwise upwardly into the pump chamber 41 to contract the same. Pursuant to this contraction of the upper pump chamber, a previously metered quantity of fuel therein was displaced therefrom downwardly through the upper reversible flow passage RU and through the reversible flow port RPU and the outlet passage OPU1 to cause an injection of this metered quantity of fuel into the engine combustion chamber connected with by the port OPU1. As the plunger 38 continues its clockwise rotation it will next arrive in the position illustrated in Figs. 2a, 3a and 4a so the upper reversible flow port RPU is no longer in communication with any of the outlet ports but, instead, establishes communication between the upper pump chamber 41 and the fuel inlet means through the fuel inlet port IP3; see Figs. 2a and 3a. Therefore fuel from the fuel inlet means is directed through the upper reversible flow passage RU into the upper pump chamber 41 to force the plunger 38 downwardly. Since at this time the lower reversible flow port RPL has now swept out of registry with any of the fuel inlet ports and is in registry with only one of the fuel outlet ports, namely, that designated OPL4, Figs. 3a and 4a, the downwardly forced plunger 38 will contract the lower pump chamber 43 for forcing the metered quantity of fuel therefrom upwardly through the reversible flow passage RL and outwardly of the device through the reversible flow port RPL and the outlet port OPL4 to cause injection of this metered quantity of fuel into the engine combustion chamber with which the port OPL4 is connected. When the plunger reaches the upper limit of its movement determined by bearing head 60 which rests against the stop member 57, an additional metered quantity of fuel will have been received by the lower pump chamber 43 so that upon the succeeding downward movement of the plunger, during continued operation of the device, this metered quantity will be forced from this chamber for discharge outwardly through the fuel outlet port of the lower set of such ports OPL1 through OPL4 with which the reversible flow port RPL will then be communicative, and so on, wherefore upon completion of each revolution of the plunger a metered amount of fuel will have been discharged through each of the outlet ports.

The metered quantity of fuel admitted to the pump chambers 41 and 43 attendant to reciprocation of the plunger 38 can be selectively varied by changing the position of the control lever 65 which is operable through the cam 57 and cooperable with the spring 58 for changing the spacing of the upper stop member 56 from the lower stop member or component 55 on the plunger driving element 45. The amount of fuel deposited in the pump chambers 41 and 43 is a direct function of the spacing of the stop means component 56 and 55 axially of the casing bore 32. Operation of the control lever 65 for obtaining this adjustment may be manual or by any type of control, not shown, responsive to operating conditions of the engine.

Irrespective of the setting of the plunger stop means, operation of the device by the drive shaft 14 which is driven by the engine to which fuel is fed by the device, causes the upper reversible flow port RPU and the upper reversible flow passage RU to establish communication of the upper pump chamber 41 alternately with ports of the inlet port means IP1 through IP4 and successive respective outlet ports in the upper set of such ports OPU1 through OPU4, and concurrently the lower reversible flow port RPL and the lower reversible flow passage RL will establish communication of the lower pump chamber 43 alternately with ports of the inlet port means IP1 through IP4 and successive respective outlet ports of the lower set of such ports OPL1 through OPL4, and the disposition of all of these ports is such that fuel is alternately admitted to the pump chambers 41 and 43 and successively discharged through the fuel outlet ports, that is, the sequence of discharge through the fuel outlet ports is first through one of the ports in the upper set of ports OPU1 through OPU4 and then through one of the outlet ports in the lower set OPL1 through OPL4 and then back to one of the outlet ports in the upper set, and so on. This is accomplished when the two sets of outlet ports are in phase circumferentially of the bore axis and the set of fuel inlet ports have an out-of-phase displacement with respect to the outlet port sets of one-half the angular spacing between the outlet ports circumferentially of the plunger axis, as explained above, by spacing the reversible flow ports circumferentially of the plunger axis by an angle which is an uneven number multiple of one-half the angle between adjacent inlet ports circumferentially of such axis. For illustration, in the present embodiment, and particularly by reference to Fig. 3, the angle between adjacent inlet ports is 90° so that one-half of this angle is 45°. The included angle between the reversible flow port RPL and RPU circumferentially of the plunger axis is 135° which is the uneven number multiple "3" of the 45° angle. The excluded angle between the reversible flow ports RPL and RPU circumferentially of the plunger axis is 225° which is the uneven number multiple "5" of said 45° angle.

Having described a single embodiment of the invention with the view of clearly and concisely illustrating the same, I claim:

1. In a liquid fuel pumping and metering distributor, a casing having spaced-apart pump chambers, a cylindrical plunger-receiving bore extending between said chambers, a plurality of outlet ports communicative with the bore at positions spaced circumferentially thereabout, and inlet port means communicative wtih the bore at positions spaced circumferentially thereabout; a plunger disposed rotatively and axially reciprocally in the bore; and reversible flow fluid conducting means in said plunger, said reversible flow conducting means being disposed for alternately establishing communication of the chambers with the inlet port means during rotation of the plunger to deposit a fuel charge in each of such chambers during such communication therewith and thus expand such chambers attendant to axially displacing the plunger to contract the other chamber, and said reversible flow conducting means being also disposed for successively establishing communication of respective of the outlet ports with said chambers during contraction thereof.

2. In a liquid fuel pumping and metering distributor, a casing having spaced-apart pump chambers, a cylindrical plunger-receiving bore extending between such chambers, a set of outlet ports communicative with said bore at positions spaced circumferentially about the principal axis of such bore, outlet port means also communicative with the bore, and fuel inlet ports communicating with the bore at positions spaced circumferentially about the bore axis; and a plunger disposed rotatively and axially reciprocally in the bore, said plunger having reversible flow passages respectively communicating with the chambers and such passages having respective reversible flow ports in the cylindrical periphery of the plunger, said reversible flow ports being disposed axially of the plunger for communicating with the inlet ports when the plunger is rotated to carry them into radial registration therewith and such reversible flow ports being spaced apart circumferentially of the plunger axis an angular distance to cause alternate registration thereof with the inlet ports pursuant to rotation of the plunger, one of the reversible flow ports being associated with the set of outlet ports in the sense of being disposed for successive communicative registration with such ports alternately with the periods of said registration of such reversible flow port with the inlet ports pursuant to rotation of the plunger, and the other reversible flow port being disposed for successive registrations with the outlet port means alternately wtih the periods of said registration of such other reversible flow port with the inlet ports pursuant to rotation of the plunger.

3. In a liquid fuel pumping and metering distributor, a casing having spaced-apart pump chambers, a cylindrical plunger-receiving bore extending between said chambers, a first set of outlet ports communicative with said bore at positions spaced circumferentially about the principal axis thereof, a second set of outlet ports communicative with said bore at positions spaced circumferentially about the axis thereof, and fuel inlet port means communicative with said bore; and a cylindrical plunger disposed rotatively and axially reciprocally in the bore, said plunger having reversible flow passages respectively communicating with the chambers and such passages having respective reversible flow ports in the cylindrical periphery of the plunger, one of said reversible flow ports being disposed for sweeping alternately through positions of communicative registration with the inlet port means and respective outlet ports in the one set, the other reversible flow port being disposed for sweeping alternately through positions of communicative registration with the inlet port means and respective outlet ports in the other set, and the operating phase relation of the reversible flow ports being that each communicates with the inlet port means while the other communicates with an outlet port and that each communicates with an outlet port while the other communicates with the inlet port means.

4. In a liquid fuel pumping and metering distributor, a casing having spaced-apart pump chambers, a cylindrical plunger-receiving bore extending between such chambers, a first set of outlet ports communicative with said bore at positions equiangularly spaced circumferentially about the principal axis of such bore, a second set of outlet ports spaced axially of the bore from the first set and also communicative with the bore at positions equiangularly spaced circumferentially about the bore axis, and a set of fuel inlet ports disposed between the sets of outlet ports axially of the bore and communicating therewith at positions equiangularly spaced circumferentially about the bore axis; a plunger disposed rotatively and axially reciprocally in the bore, said plunger having reversible flow passages respectively communicating with the chambers and such passages having respective reversible flow ports in the cylindrical periphery of the plunger, said reversible flow ports being disposed axially of the plunger for communicating with the inlet ports when the plunger is rotated to carry them into radial registration therewith and such reversible flow ports being spaced apart circumferentially of the plunger axis an angular distance to cause alternate registration thereof with the inlet ports pursuant to rotation of the plunger, one of the reversible flow ports being associated with the one set of outlet ports in the sense of being disposed for successive communicative registration with such ports alternately with the periods of said registration of such reversible flow port with the inlet ports pursuant to rotation of the plunger, and the other reversible flow port being similarly associated with the other set of outlet ports to successively register with such outlet ports alternately with the periods of said registration of such other reversible flow port with the inlet ports pursuant to rotation of the plunger.

5. In a liquid fuel pumping and metering distributor, a casing having spaced-apart pump chambers, a cylindrical plunger-receiving bore extending between such chambers, a first set of outlet ports communicative with said bore at positions equiangularly spaced circumferentially about the principal axis of such bore, a second set of outlet ports spaced axially of the bore from the first set and also communicative with the bore at positions equiangularly spaced circumferentially about the bore axis, and a set of fuel inlet ports disposed between the sets of outlet ports axially of the bore and communicating therewith at positions equiangularly spaced circumferentially about the bore axis, each of said port sets having the same number of ports, the two sets of outlet ports being in phase circumferentially of the bore axis, and the set of fuel inlet ports having an out-of-phase displacement with respect to the outlet port sets of one-half the angular spacing between the outlet ports circumferentially of such axis; a plunger disposed rotatively and axially reciprocally in the bore, said plunger having reversible flow passages respectively communicating with the chambers and such passages having respective reversible flow ports in the cylindrical periphery of the plunger, said reversible flow ports being disposed axially of the plunger for communicating with the inlet ports when the plunger is rotated to carry them into radial registration therewith and such reversible flow ports being spaced apart circumferentially of the plunger axis an angular distance to cause alternate registration thereof with the inlet ports pursuant to rotation of the plunger, one of the reversible flow ports being associated with the one set of outlet ports in the sense of being disposed for successive communicative registration with such ports alternately with the periods of said registration of such reversible flow port with the inlet ports pursuant to rotation of the plunger, and the other reversible flow port being similarly associated with the other set of outlet ports to successively register with such outlet ports alternately with the periods of said registration of such other reversible flow port with the inlet ports pursuant to rotation of the plunger.

6. In a liquid fuel pumping and metering distributor, a casing having spaced-apart pump chambers, a cylindrical plunger-receiving bore extending between such chambers, a first set of outlet ports communicative with said bore at positions equiangularly spaced circumferentially about the principal axis of such bore, a second set of outlet ports spaced axially of the bore from the first set and also communicative with the bore at positions equiangularly spaced circumferentially about the bore axis, and a set of fuel inlet ports disposed between the sets of outlet ports axially of the bore and communicating therewith at positions equiangularly spaced circumferentially about the bore axis, each of said port sets having the same number of ports, the two sets of outlet ports being in phase circumferentially of the bore axis, and the set of fuel inlet ports having an out-of-phase displacement with respect to the outlet port sets of one-half the angular spacing between the outlet ports circumferentially of such axis; a plunger disposed rotatively and axially reciprocally in the bore, said plunger having reversible flow passages respectively communicating with the chambers and such passages having respective reversible flow ports in the cylindrical periphery of the plunger, said reversible flow ports being disposed axially of the plunger for communicating with the inlet ports when the plunger is rotated to carry them into radial registration therewith and the angle between the reversible flow ports circumferentially of the plunger axis being an uneven number multiple of one-half the angle between adjacent inlet ports circumferentially of such axis, one of the reversible flow ports being associated with the one set of outlet ports in the sense of being disposed for successive communicative registration therewith during rotation of the plunger, and the other reversible flow port being similarly associated with the other set of outlet ports to successively register therewith during rotation of the plunger.

7. In a liquid fuel pumping and metering distributor, a casing having spaced-apart pump chambers, a cylindrical plunger-receiving bore extending between said chambers, a plurality of outlet ports communicative with the bore at positions spaced circumferentially thereabout, and inlet port means communicative with the bore at positions spaced circumferentially thereabout; a plunger disposed rotatively and axially reciprocally in the bore; a plunger rotating element mounted in the casing at one end of the plunger and for rotation coaxially therewith; means connecting said plunger rotating element with the plunger for rotating the same but facilitating axial movement of the plunger relative to such element; a fuel supply pump comprising a rotatable pumping element disposed within said casing, the supply pump having a fuel inlet and a fuel outlet; channel means communicating between the supply pump outlet and said inlet port means; a drive shaft journalled in the casing and having a driving connection with the rotatable element of the supply pump and with said rotatable drive element for rotating the latter and for operating the supply pump to maintain fuel pressure through the outlet thereof and the channel means into the inlet port means; stop means for limiting movement of the plunger in opposite axial directions and adjustable for selectively limiting the axial movement of the plunger; and reversible flow fluid conducting means in said plunger, said reversible flow conducting means being disposed for alternately establishing communication of the chambers with the inlet port means during rotation of the plunger to deposit a fuel charge in each of such chambers during such communication therewith and thus expand such chambers attendant to axially displacing the plunger to contract the other chamber, and said reversible flow conducting means being also disposed for successively establishing communication of respective of the outlet ports with said chambers during respective contractions thereof.

8. The combination set forth in claim 7, wherein the rotatable pumping element of the supply pump is disposed coaxially with the drive shaft and with the plunger rotating element, and wherein said driving connection is operable to constrain said elements for rotation in unison with the drive shaft.

9. The combination set forth in claim 7, wherein the drive shaft is rotatable coaxially with the plunger rotating element and with the pumping element, wherein said shaft has a recessed inner end portion upon which the pumping element is mounted for rotation with the shaft, wherein the plunger rotating element has a driven end portion disposed within the shaft end portion recess, wherein there is means connecting such driven end portion for rotation with the shaft while facilitating universal angular disalignment of the plunger rotating element relatively to the shaft axis, and wherein the means connecting the plunger rotating element with the plunger is also adapted to facilitate universal angular disalignment of such element relatively to the plunger axis.

10. The combination set forth in claim 7, wherein the stop means for the plunger comprises a stop component on the plunger rotating element abuttable by the one end of the plunger, and an axially adjustable stop component abuttable by the opposite end of the plunger.

References Cited in the file of this patent

UNITED STATES PATENTS

| | | |
|---|---|---|
| 2,270,263 | Butler | Jan. 20, 1942 |
| 2,667,840 | High | Feb. 2, 1954 |
| 2,759,422 | Miller | Aug. 21, 1956 |

FOREIGN PATENTS

| | | |
|---|---|---|
| 1,080,325 | France | July 3, 1953 |